May 11, 1965 H. KUNEL 3,183,009
GROOVED PACKING CUP
Original Filed March 3, 1959 2 Sheets-Sheet 1
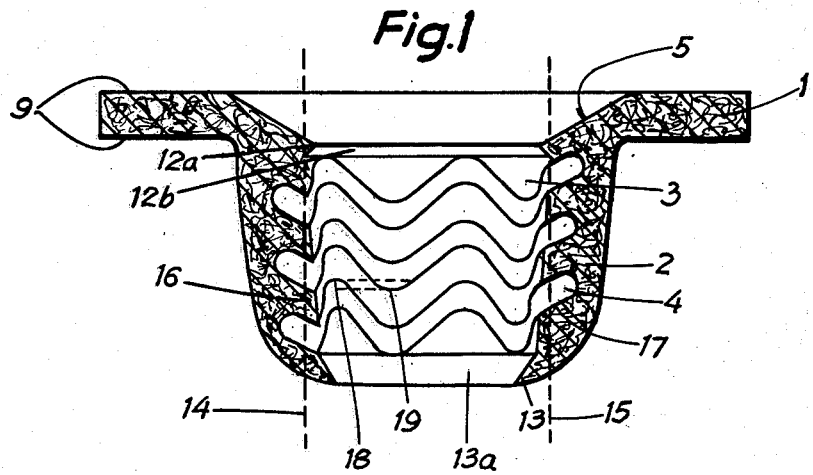
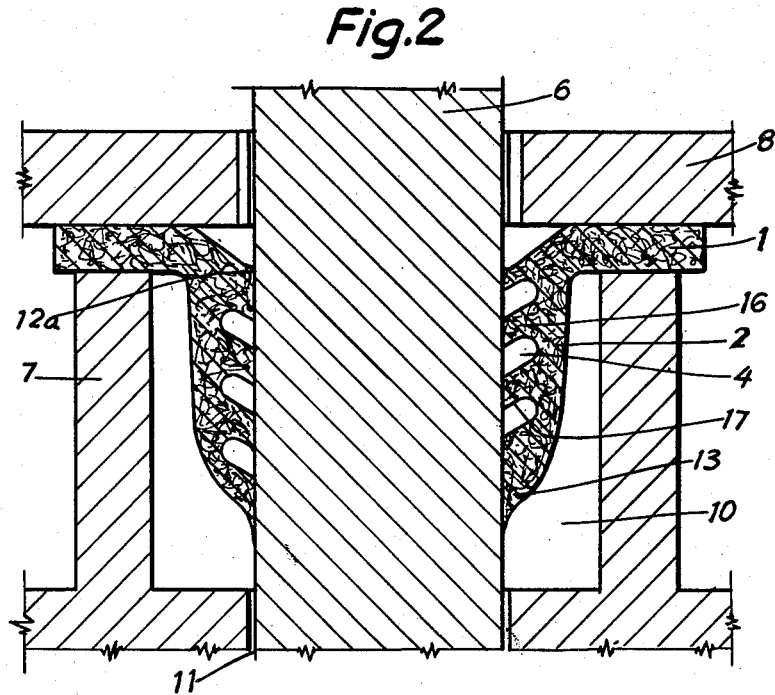
INVENTOR
HEINRICH KUNEL
BY Toulmin & Toulmin
ATTORNEYS

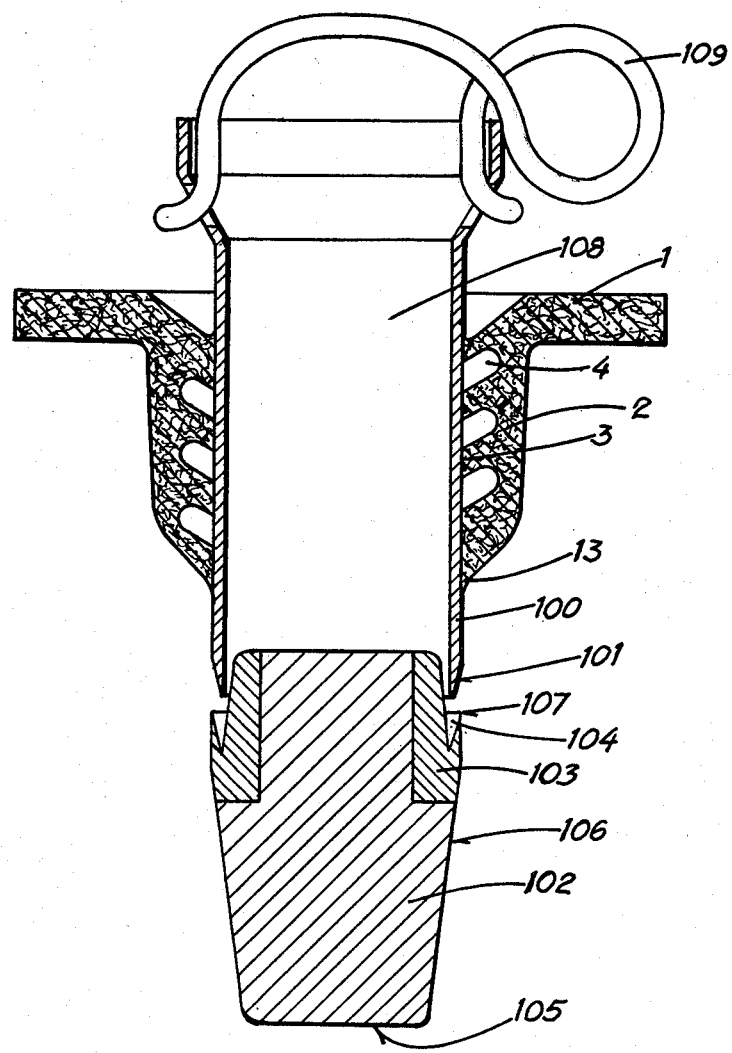

United States Patent Office 3,183,009
Patented May 11, 1965

3,183,009
GROOVED PACKING CUP
Heinrich Kunel, 25 Goethestrasse, Rehau,
Bavaria, Germany
Continuation of application Ser. No. 796,907, Mar. 3,
1959. This application Sept. 19, 1963, Ser. No. 310,076
1 Claim. (Cl. 277—208)

This invention relates to packings which are adapted for sealing and lubricating sliding and rotary shafts, rods and the like, to provide a tight joint against the leakage of fluids.

This application is a continuation of application Ser. No. 796,907, filed March 3, 1959, now abandoned.

An object of my invention is to produce a packing of the aforementioned type which, in addition to affording excellent sealing, insures a completely satisfactory lubrication.

In conventional packing and stuffing boxes, for instance, it has hitherto been necessary to exert very strong pressure on the packing material in order to effect a tight seal against high pressure media. Such packing structures exert a strong frictional braking action on the movable mechanical part which is undesirable.

To overcome this braking action it has been proposed heretofore to include a lubricant in the packings. Such packings, however, do not give entirely satisfactory results because the lubricant does not last. As a further drawback it is difficult to change or replace the packing material without the use of a great deal of force with the result that the movable mechanical parts are often damaged.

Other attempts to overcome the above-mentioned drawbacks have been made in the packing art. For example, packing means without stuffing boxes, but such structures have not been satisfactory because the packing material cannot be fitted in existing stuffing boxes and require special constructions. Apart from the above-mentioned known types of packings, other types have been employed, for example sleeve-type packings of various constructions. A characteristic feature of such packings is the lip-shaped portions of the packing. The function of the sleeve is to press these prestressed lip-shaped portions against the rotating or sliding member by the pressure of the fluid medium acting on the packing. Such packings require no lubrication, but the constant dry frictional force exerted by the lips against the moving mechanical member necessarily results in wearing away of the lips. For this reason the sealing effect of such packing structures becomes seriously impaired in use. Further, the replacement of such sleeve-type packings is very complicated and time-wasting in most cases because of their conventional closed ring-shapes.

It is an object of the present invention to provide an improved packing which is provided with an inner surface which is in constant contact with the guided member, for instance, an engine shaft, piston rod or the like, and which comprises a number of recesses or grooves for receiving lubricant. The recesses are spacedly arranged axially of the shaft and extend in a closed path or paths, for example, of circular or elongated shape. The side walls of the recesses or grooves preferably form an oblique angle with the central axis of the bore of the packing and extend in undulating grooves or channels about the longitudinal central axis of the packing. The grooves likewise extend substantially parallel to each other. This particular shape and spacing of the grooves insures that the sections of the lubricating film supplied by the individual grooves overlap, whereby the sliding surface of the shaft or guided member is limited at each end of the packed region by a packing lip.

The grooved packing is preferably made of rubber or the like material having elastomeric properties. In addition, the packing material is required to resist greases and oils and be proof against ageing and attack by ozone. For this purpose, polyurethane plastics and neoprene rubber have been found to be suitable.

Packings made in accordance with the present invention have proved satisfactory for the following purposes: as packing for stuffing boxes and which may be used in conventional structures; as packings for preventing leakage of lubricant from bearing surfaces in particular in ball bearings; as packing for sealing bearings as used in gear boxes for compressors; and the like.

The packing according to the invention, is particularly suitable wherever continuous servicing and supervision are not possible because the place of the packing is not easily accessible. This is the case, for example, where the packings must be used underground, as in pressure conduits and the like. In such cases, it is generally of great importance that constant lubrication be provided. In the special constructions now in use and where ordinary packings are used, it is impossible to prevent corrosion and deterioration of the packing material, particularly under atmospheric conditions. Furthermore, caking and seizing of such packings may occur to an even greater extent. In the case of underground use, a very strong pressure is exerted on one side of the packings, particularly in high pressure pipe lines, whereby damage to the packing may be caused by fluctuating pressures with resultant leakage in the line. Deterioration of the packings is generally caused by penetration of the carried medium into the sealed space adjacent the packings and which causes a softening of the packing. The packings constructed in accordance with this invention are adapted for use in underground pressure pipe lines and the like.

In the use of packings in connection with valves and sliders, means are required for fixing and also sealing the packing with respect to the housing of the stuffing box. Such constructions require that the sleeve-type packing means comprises a mechanical fastening element or parts, for example, a flange or the like, to secure the same in place. The great differences in pressure occurring with such elements also necessitates that a suitable pre-tension or compression means be provided at the end portion of the packing and which is located on the pressure side. This compressive force is attained by tapering the bore towards the end on which the pressure acts. The external shape of the respective packing is, therefore, made conical in shape so as to increase its elasticity towards the pressure space. In this manner, conditions are produced which enable the sealing lips to bear against the sealed member and which produces enhanced sealing, particularly in the case of stresses exerted on the packing due to fluctuating pressures acting thereon. The conical shape of the packing is an important feature because of the forces exerted by the fluid medium under pressure that creates stress against the packing which is redirected so that such forces tend to increase the contact of the sealing lip located on the pressure side and acting against the sealed member, whereby improved sealing of the packing is obtained without increasing the wear or frictional pressure on the packings.

The sealing lips, as hereinafter described, function to provide efficient sealing of the entire packing. Any damage to the sealing lips structure results in lowering the efficiency and life of the packing. To avoid this possibility, and to provide packings of long life in use, the grooves in the packing are arranged so that they make at an angle to the central rotary axis of the sealed member, and are inclined towards the pressure space. Additional sealing lips are also provided which cooperate with a main sealing lip to thus insure a perfect sealing of the packing at all times. In order to utilize the fluctuations in pressure which occur in fluid pressure pipe lines, and which require additional lubrication, the fastening part of the packing, for example, a flange, collar, or the like, is beveled circularly in the direction towards the axis of the packing. In this manner the clamped-in packing is given the properties of a diaphragm so that it can swing in the direction of the central axis of the packing with the result that the sealing lip can carry out sliding movements along the surface of the structural part which it surrounds. The sliding surfaces of the lips which are in themselves very small thus receive an additional lubrication. This construction is particularly advantageous when the sealing lips due to their being very small are not themselves provided with recesses for receiving the grease.

In some instances, the packing elements must be mounted in such a manner that only slight pressures occur between the sealing lips and the elements to be sealed, e.g. shaft or rod. This is the case with sliding or bearing collars which, while retaining their structural principle, insure full lubrication, but the bore of which is barrel-shaped or cylindrical. The sealing lips which enclose the lubricant in the packing as in small reservoir must then also carry out the additional function of a sliding bearing.

The invention will be still better understood, from the description hereinafter of several embodiments of the same in connection with the accompanying drawings in which:

FIGURE 1 shows a packing according to the invention, in cross section, which is provided with a central conical passage with undulating grooves.

FIGURE 2 is a longitudinal section of the packing shown in FIGURE 1 fitted about a movable member; and FIGURE 3 is a longitudinal section through a packing according to the invention, equipped with an assembly tube and expansion cone showing the use of the latter when introduced in the packing for mounting the same.

In all figures like reference numerals designate like parts.

A fastening element, for example, a flange of the packing 2, is designated by 1. Packing 2 is provided with a central bore 3. Between grooves 4 in the wall of the central bore there are left unrecessed the ribs 16 bearing the sliding and sealing surfaces 3 and flank walls 17. Flange 1 is provided with a circular bevel surface 5 which is concentric with the central bore 3 of the packing. The packing may be mounted on a member to be sealed, for instance, a shaft 6. The wall of a stuffing box in which the packing 2 may be used is designated by 7 and the gland pertaining thereto. The stuffing box space 10 is sealed from the pressure space by the faces 9 of packing flange 1. The surface 11 of the shaft 6 is closely embraced by an upper sealing lip 12a and a lower sealing lip 13. The upper sealing lip 12a has a circular surface 12b and the lower sealing lip an internal circular surface 13a.

In order to give the packing the necessary pretension, the diameter of bore 3 is preferably made smaller than that of the shaft, as illustrated by the dashed lines 14 and 15 in FIGURE 3. The ribs 16, as can be seen by reference to FIGURE 2, have flank walls 17 extending at an angle to the axis of the spindle in the direction of the pressure space.

The dashed lines 18 and 19 in FIGURE 1 indicate that the different sections of the lubricant film extruded from the undulating grooves 4 overlap in accordance with the invention, to provide efficient and effective lubrication under any conditions of use.

The packing according to the invention is prepared in the following manner for mounting on a shaft, rod or other member which is to be sealed.

As the internal diameter of the packing is considerably smaller than the diameter of the shaft 6, it is not possible to fit the packing properly without the aid of auxiliary tools. Even if the packing is fitted without such tools or with unsuitable means, it may satisfy all requirements in the case of slowly rotating shafts, but the whole annular tensile stress must then be carried by the sliding surfaces 3 of the ribs 16 with the result that the major portion of each rib projecting in unfitted state beyond the shaft cylinder designated by lines 14 in FIGURE 1, will in the fitted state, be pressed into the grooves 4 and, as a consequence, these grooves will be considerably reduced in size. It is, however, preferable that grooves 4 bear against the spindle 6 via an intermediary film of oil or grease formed by the pressure of the latter, so that the ribs retain their original shape and their sliding surfaces 3 "float," in a manner of speaking, on an oil film. This can be attained, for example, by filling the annular grooves 4 as well as the sliding surfaces 3 from the projection 12a to the projection 13 with oil or grease by centrifuging or immersion in a bath, prior to mounting. The packing is then widened with the aid of a cone 102, the narrower end face of which corresponds to the narrowest diameter of the bore in the packing and which cone is drawn onto a tube 108 for fitting. The tapered end 105 of the cone is introduced first from the flange end of the packing and drawn through the latter, thereby widening the bore of the packing to enable the fitting tube 100 to be inserted. A sealing member 103 composed of, for example rubber-like material, is mounted on the cone 102 and its annular slot 104 receives the sharpened lower edge 101 of the fitting tube 100. As the cone is being pushed through the packing, the sliding surfaces 3 slide over the smooth side 106 of the cone and over the packing 103 onto the fitting tube 100. The overlap 107 enables the packing 2 to pass over easily from the cone onto the fitting tube 100. The previously introduced lubricant is now under pressure because the body of packing 2 is expanded. This pressure cannot be released between the fitting tube 100 and the cone 102 when the packing is being drawn thereon because such release is prevented by the sealing member 103.

As the lips 12a and 13 are under increased tensile and compressive stress, the excess of lubricant can only partly escape. The walls of the grooves 4 and the sliding surfaces 3 rest on an oil or grease film due to the counter-pressure of the lubricant; the packing floats with almost its entire tensional pressure on the lubricant. The packing is then ready for fitting. No further equipment is required for effecting the fitting on to a member to be sealed. The fitting tube 100 with the packing 2 mounted thereon is slipped over the greased shaft 6, so that the shaft 6 is placed in the internal space 108 of the fitting tube 100 and the fitting tube removed in a single pull by means of a pulling element 109 in the form of a cord or the like. Thereby, first lip 13 and thereafter lip 12a come into contact with the shaft 6. The grease applied onto the shaft 6 therefore remains imprisoned so that, as the packing 2 bears against the shaft 6, only some excess grease will be forced out. As a result, the lubricant cushion under pressure also remains on the shaft 6 as it did before on fitting tube 100. Consequently, the inner surfaces 3 of the packing 2 rest on lubricant without the full tensional pressure of the annular tensile stress of the packing arm being able to bear on the sliding surfaces 3 of the ribs 16. The lubricant under pressure therefore prevents any squeezing effect being exerted on the ribs 16.

The packing structure of the present invention is particularly useful as a packing around a rotatable shaft which must be continuously lubricated over its entire surface. Prior art packings have not been designed nor constructed so as to accomplish this feature. Packings made in accordance with the present invention have been found to solve this difficult problem by the provision of a plurality of undulating grooves which are arranged axially along the working surface of the packing as heretofore described. These grooves are filled with lubricant and the ridges between the grooves are in engagement with the rotatable shaft. While the ridge portions of the packing between the grooves engage the shaft, still there is constant application of lubricant because of the undulating shape of the grease filled grooves.

The undulated groove distinguishes from helical shaped grooves which function differently. Use of helical grooves results in causing the lubricant to flow outwardly and away from the working surfaces of the packing which is undesirable. On the other hand, by utilizing (a) sealing lips and (b) the provision of separate undulating grooves as in the improved packings of this invention, and wherein the grooves are arranged substantially equidistant from each other results in causing the lubricant to be retained in each groove of the packing. In this manner the lubricant is held constantly in contact with the moving surfaces of a shaft or rod around which the packing engages. To this end, the upper and lower sealing lips, as described, effectively retain the lubricant within the body of the packing where it is in position to maintain the shaft continuously lubricated. This is particularly important in packings surrounding rotating shafts.

Further use of packings having cups or pockets for containing lubricant do not operate to feed lubricant constantly toward and as an overlapping film on the working surfaces of the adjacent shaft as the packing constructed in accordance with the present invention. The enhanced and unexpected improvement in the packings is believed to result principally because of the undulated groove structure of the packings, including the provision of upper and lower sealing lips having inner diameters which are smaller than the diameter of the shaft, and the grooves being substantially parallel and filled with lubricant with the side walls of the grooves forming an oblique angle with the central axis of the bore and extending in an undulating manner about this axis of the bore.

It will be understood that this invention is susceptible to modification in order to adapt it to different usages and conditions, and, accordingly, it is desired to comprehend such modifications within this invention as may fall within the scope of the appended claim.

What is claimed is:

A packing surrounding a rotatable shaft and forming a seal therefor, said packing being integral and of elastic material, and comprising a packing body, a flange integral with said packing body at one end thereof, a central bore through said packing body and flange, an upper sealing lip at the entrance to said bore in said flange, a lower sealing lip provided at the opposite entrance to said bore, said upper and lower sealing lips having inner diameters smaller than the diameter of said shaft, and a plurality of parallel axially spaced grooves in the inner wall of said bore receiving lubricant therein, said groove forming channels, each having substantially parallel side walls and bottom walls, each of the walls of the channels extending outwardly toward the lower sealing lip and forming like oblique angles with the axis of the central bore, and the edges of said walls extending in parallel undulating form about the surface of said shaft, thereby subjecting said shaft upon rotation thereof to constantly alternating juxtaposition with a lubricant filled groove portion and in engagement with a wall portion of said bore intermediate said groove.

References Cited by the Examiner
UNITED STATES PATENTS 2,350,123  5/44  Mercier _____ 277—212
2,489,715  11/49  Mark et al. _____ 277—212

FOREIGN PATENTS 295,481  12/16  Germany.
499,480  1/39  Great Britain.

LEWIS J. LENNY, *Primary Examiner.*
EDWARD V. BENHAM, *Examiner.*